United States Patent
Yamaguchi et al.

(10) Patent No.: US 6,757,936 B2
(45) Date of Patent: Jul. 6, 2004

(54) WHEEL OF TRAVELING STRUCTURE

(75) Inventors: Shinji Yamaguchi, Kanagawa (JP); Shinichi Asai, Kanagawa (JP)

(73) Assignee: Kyosho Corporation, Tokyo (JP)

(*) Notice: Subject to any disclaimer, the term of this patent is extended or adjusted under 35 U.S.C. 154(b) by 0 days.

(21) Appl. No.: 10/219,946

(22) Filed: Aug. 16, 2002

(65) Prior Publication Data

US 2003/0037410 A1 Feb. 27, 2003

(30) Foreign Application Priority Data

Aug. 24, 2001 (JP) .................................... 2001-254451

(51) Int. Cl.[7] .................................... B60B 33/00
(52) U.S. Cl. .................... 16/47; 16/45; 16/31 R
(58) Field of Search .......................... 16/45–48

(56) References Cited

U.S. PATENT DOCUMENTS

| | | | | |
|---|---|---|---|---|
| 481,963 A | * | 9/1892 | Minor | 16/46 |
| 962,308 A | * | 6/1910 | Burnett | 16/47 |
| 1,305,535 A | * | 6/1919 | Grabowiecki | 16/45 |
| 3,253,632 A | * | 5/1966 | Dalrymple | 301/5.23 |
| 3,465,843 A | * | 9/1969 | Guinot | 301/5.23 |
| 3,649,981 A | | 3/1972 | Woodworth | |
| 3,746,112 A | | 7/1973 | Ilon | |
| 3,789,947 A | * | 2/1974 | Blumrich | 301/5.23 |
| 4,150,508 A | | 4/1979 | Ogawa | |
| 4,167,830 A | | 9/1979 | Ogawa | |
| 4,206,564 A | | 6/1980 | Ogawa | |
| 4,223,753 A | | 9/1980 | Bradbury | |
| 4,248,006 A | | 2/1981 | Jones et al. | |
| 4,313,511 A | | 2/1982 | Soo Hoo | |
| 4,335,899 A | * | 6/1982 | Hiscock | 280/259 |
| 4,484,646 A | | 11/1984 | Smith | |
| 4,715,460 A | | 12/1987 | Smith | |
| 4,739,851 A | | 4/1988 | Perego | |
| 4,926,952 A | * | 5/1990 | Farnam | 180/6.5 |
| D309,254 S | * | 7/1990 | Guile | 16/45 |
| D318,791 S | * | 8/1991 | Guile | D8/375 |
| 5,052,680 A | | 10/1991 | Malewicki et al. | |
| 5,183,133 A | | 2/1993 | Roy et al. | |
| 5,276,942 A | * | 1/1994 | Estkowski et al. | 16/47 |
| 5,383,715 A | * | 1/1995 | Homma et al. | 301/5.23 |
| 5,815,885 A | * | 10/1998 | Chen | 16/47 |
| 5,868,600 A | | 2/1999 | Watanabe | |
| D435,437 S | * | 12/2000 | Guile | D8/375 |
| 6,340,065 B1 | | 1/2002 | Harris | |
| 6,564,955 B2 | | 5/2003 | Franzen et al. | |

FOREIGN PATENT DOCUMENTS

JP 04257701 A * 9/1992 ........... B60B/33/00

* cited by examiner

Primary Examiner—Lynne H. Browne
Assistant Examiner—Christopher Boswell
(74) Attorney, Agent, or Firm—Nixon & Vanderhye P.C.

(57) ABSTRACT

Problems in a conventional wheel of a traveling structure are solved, which in a traveling toy, the lateral movement cannot be performed reducing a game fascinating aspect and it is difficult to differentiate the toy from other traveling toys, and when a field is furrowed with a cultivator, upon completion of the furrowing at the field end, the cultivator has to be revolved at the field end to form the next furrow, so that an additional field area is required or when the additional area is not available, a field portion is generated where the furrow cannot be formed. A wheel for a traveling structure comprises an auxiliary-wheel carrier that rotates when the traveling structure proceeds straight and revolves, and a plurality of auxiliary wheels attached to the auxiliary-wheel carrier rotatably in a direction perpendicular to the rotational direction of the auxiliary-wheel carrier, part of the auxiliary wheels being exposed from the external peripheral surface of the auxiliary-wheel carrier.

6 Claims, 4 Drawing Sheets

WHEEL OF TRAVELING STRUCTURE

BACKGROUND OF THE INVENTION

1. Field of the Invention

The present invention relates to a wheel of a traveling structure being rotated by a driving source such as a motor while being also movable in the direction perpendicular to the rotational direction of the wheel, and in particular relates to a wheel of a traveling structure most suitable for use in a robot for searching planets.

2. Description of the Related Art

In conventional wheels, such as wheels of a traveling toy, the wheels called tires are rotated by a rotational force of a driving source, so that the traveling structure only performs proceeding back and forth and lateral revolving by the rotational force and steering operation. Also, a conventional cultivator can only proceed back and forth and revolve laterally.

By the way, in the traveling toy mentioned above, the lateral movement cannot be performed, so that a game fascinating aspect is inadequate, and there has been a problem that it is difficult to differentiate the toy from other traveling toys. Also, when a field is furrowed with a cultivator, for example, upon completion of the furrowing at the field end, the cultivator has to be revolved at the field end to form the next furrow. In this case, an additional field area is required, or when the additional area is not available, there has been a problem that a field portion is generated where the furrow cannot be formed.

SUMMARY OF THE INVENTION

The present invention has been made to solve the above-mentioned problems, and it is an object thereof to provide a wheel of a traveling structure capable of traveling just beside as well as the back and forth moving, and lateral revolving as the same way as in a conventional traveling structure.

A wheel of a traveling structure according to the present invention is to achieve the object mentioned above, and in accordance with a first aspect of the present invention, a wheel for a traveling structure comprises an auxiliary-wheel carrier that rotates when the traveling structure proceeds straight and revolves, and a plurality of auxiliary wheels attached to the auxiliary-wheel carrier rotatably in a direction perpendicular to the rotational direction of the auxiliary-wheel carrier, part of the auxiliary wheels being exposed from the external peripheral surface of the auxiliary-wheel carrier.

In accordance with a second aspect of the present invention, a wheel for a traveling structure comprises a pair of substantially hemispherical auxiliary-wheel carriers having a plurality of grooves formed in a radial direction and bearings formed on both sides of the grooves, and, a plurality of auxiliary wheels attached to the auxiliary-wheel carriers with shafts journaled on the bearings in a state that part of the auxiliary wheels is exposed from the grooves.

In accordance with a third aspect of the present invention, a wheel for a traveling structure comprises an auxiliary-wheel carrier that rotates when the traveling structure proceeds straight and revolves, and a plurality of auxiliary wheels arranged in at least a double-column arrangement relative to the auxiliary-wheel carrier in a direction perpendicular to the rotational direction of the auxiliary-wheel carrier, part of the auxiliary wheels being exposed from the external peripheral surface of the auxiliary-wheel carrier.

In accordance with a fourth aspect of the present invention, a wheel for a traveling structure comprises a substantially cylindrical auxiliary-wheel carrier having a plurality of grooves formed on both sides of the peripheral face in an axial direction and bearings formed on both sides of the grooves, a plurality of auxiliary wheels attached to the auxiliary-wheel carrier with shafts journaled on the bearings in a state that part of the auxiliary wheels is exposed from the grooves, and caps for covering both sides of the auxiliary-wheel carrier.

Preferably, the auxiliary wheels arranged in the double-column are staggered to each other; and the wheel is used for a traveling toy and a utility vehicle.

According to the present invention, as described above, a wheel for a traveling structure comprises an auxiliary-wheel carrier that rotates when the traveling structure proceeds straight and revolves, and a plurality of auxiliary wheels attached to the auxiliary-wheel carrier rotatably in a direction perpendicular to the rotational direction of the auxiliary-wheel carrier, part of the auxiliary wheels being exposed from the external peripheral surface of the auxiliary-wheel carrier, so that when the auxiliary-wheel carrier rotates, the auxiliary wheels are brought into contact with a road surface so as to rotate while biting the road surface as if they were caterpillars, preventing slippage. When the wheels are stopped, if a force is applied to the traveling structure in the direction perpendicular to the rotational direction of the wheels, the auxiliary wheels are rotated relative to the auxiliary-wheel carrier, so that the traveling structure can be moved just bilateral.

When a wheel for a traveling structure comprises an auxiliary-wheel carrier that rotates when the traveling structure proceeds straight and revolves and a plurality of auxiliary wheels arranged in at least a double-column relative to the auxiliary-wheel carrier in a direction perpendicular to the rotational direction of the auxiliary-wheel carrier, part of the auxiliary wheels being exposed from the external peripheral surface of the auxiliary-wheel carrier, while the above-mentioned effect can be obtained as well, since the auxiliary wheels are arranged in at least a double-column, the grounding area to the road surface is increased, the traveling structure can travel without slipping even on a sloppy road.

DESCRIPTION OF THE PREFERRED EMBODIMENTS

Figure 1:
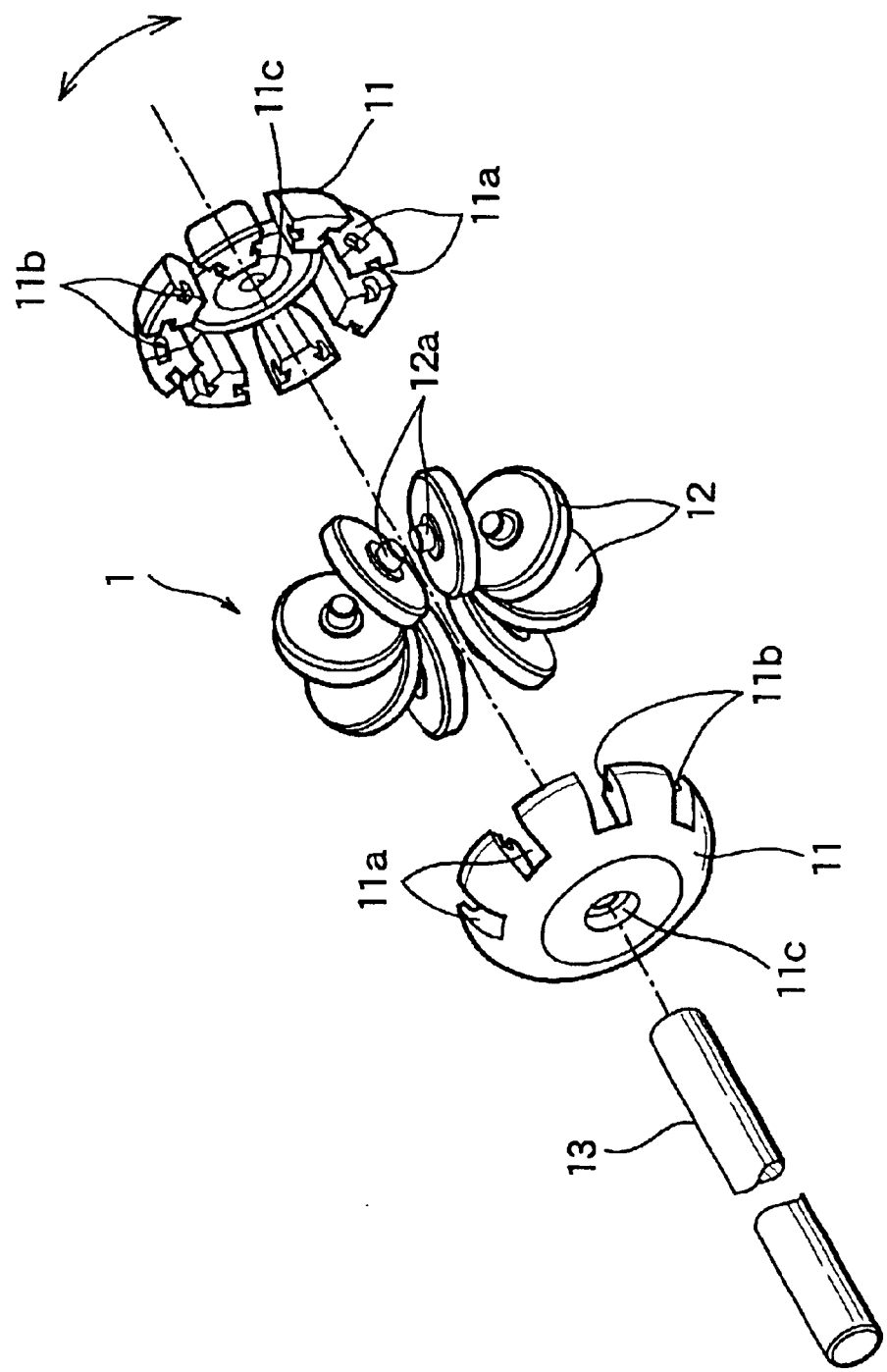
FIG. 1 is an assembly view of a wheel of a traveling structure according to a first embodiment of the present invention.

A wheel of a traveling structure according to a first embodiment of the present invention will be described below with reference to FIGS. 1 to 3.

A wheel 1 comprises a pair of auxiliary-wheel carriers 11, a plurality of auxiliary wheels 12 (eight in the drawing), and one axle shaft 13. The opposing surface of each auxiliary-wheel carrier 11 is provided with a plurality of grooves 11a, into which the auxiliary wheels 12 are inserted, and bearings 11b for journaling shafts 12a of the auxiliary wheels 12 formed therein.

A through-hole 11c is formed in the center of each auxiliary-wheel carrier 11, and the axle shaft 13 is inserted into and stuck to the through-holes 11c. Although not shown, on one side of one of the auxiliary-wheel carriers 11, a gear and pulley are fixed, which in turn are connected to a driving source via a reducer gear train.

Figure 2:
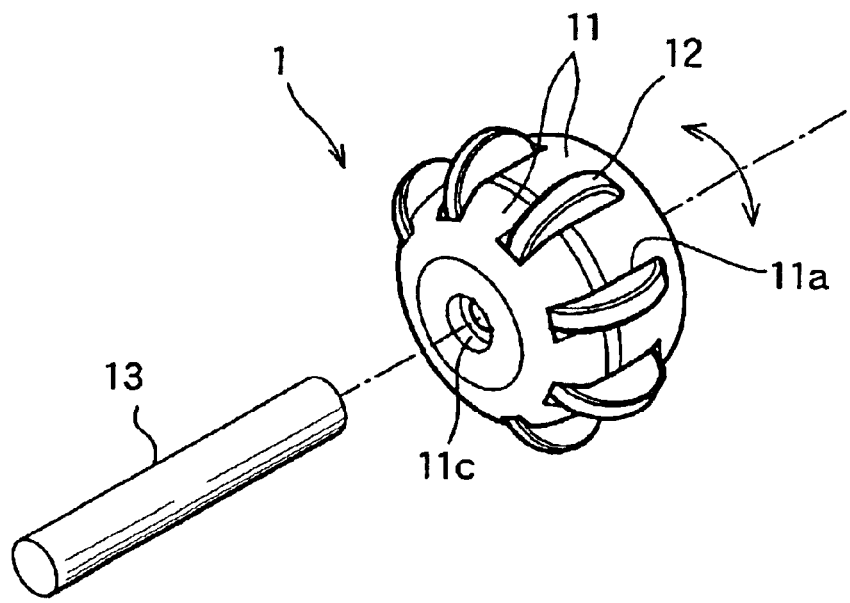
FIG. 2 is a perspective view of the wheel in an assembled state.
Figure 3:
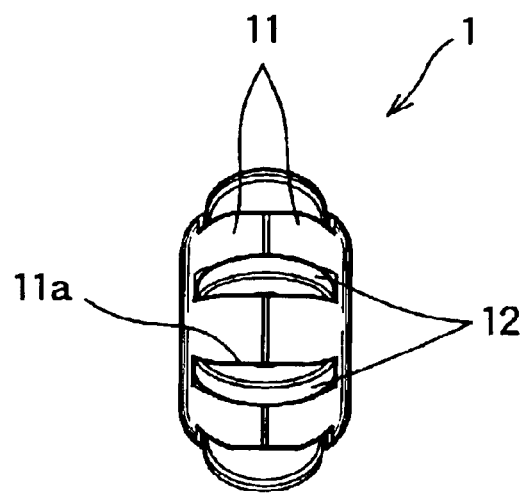
FIG. 3 is a front view of the wheel in the assembled state.

In the wheel 1 configured as described above, when a rotational force is applied in the arrow directions in FIG. 2, the wheel 1 is movable in the rotational direction by the frictional force between the auxiliary wheels 12 and a supporting surface. On the other hand, when a moving force is applied in the direction parallel to the axle shaft 13, the auxiliary wheels 12 become a state of idle running, so that the structure is smoothly movable in the direction perpendicular to the arrow directions.

Accordingly, when a field is furrowed with a cultivator having the above-mentioned wheels, the wheels 1 are positively driven by a driving force from the driving source so as to proceed in the same way as in a conventional traveling structure; then, when approaching the field end, the traveling structure is pushed just beside to move to the next furrowing portion and then, the wheels 1 are reversed to form the next furrow while moving backward.

Figure 4:
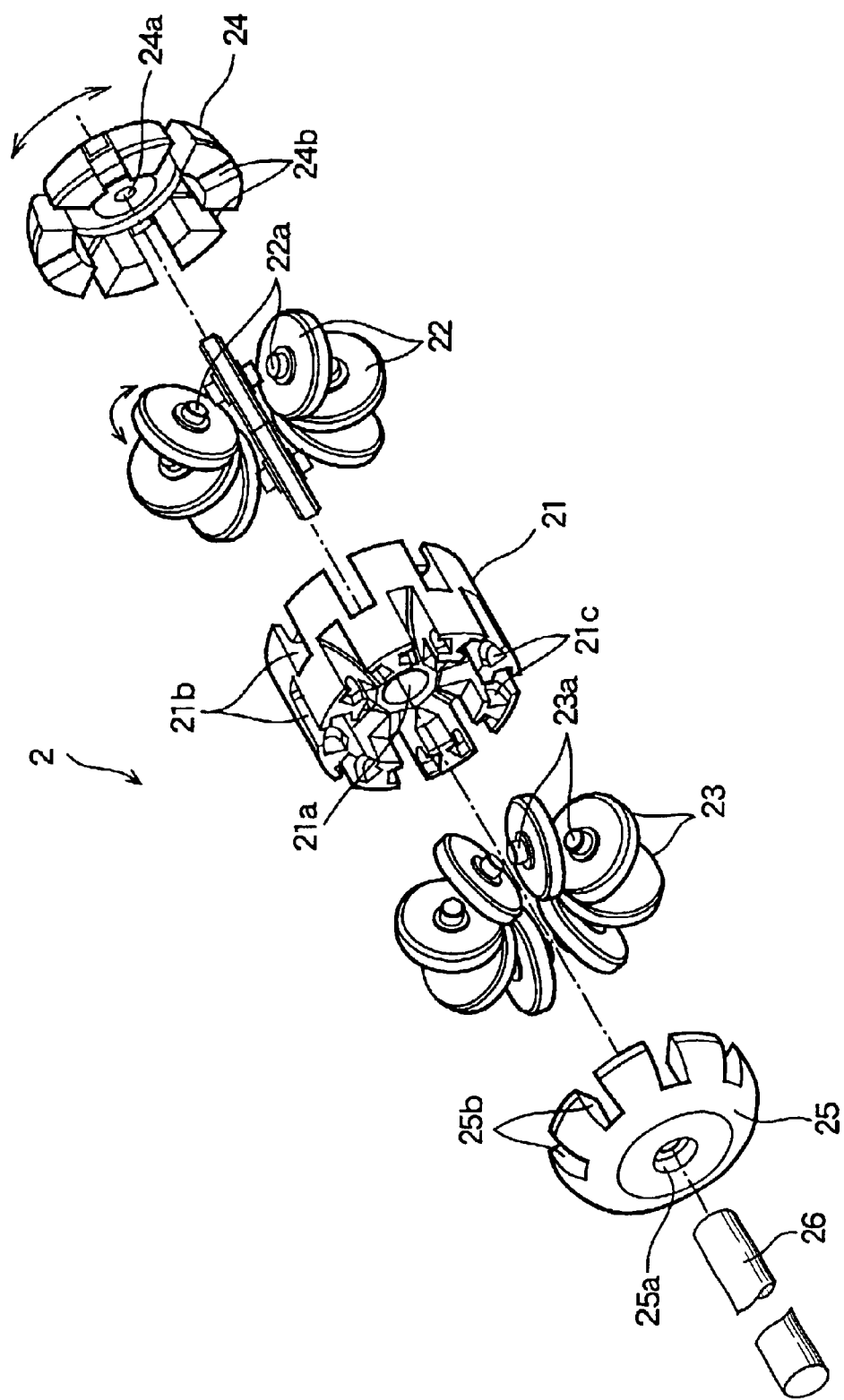
FIG. 4 is an assembly view of a second embodiment.

Next, a second embodiment will be described with reference to FIGS. 4 to 6.

According to the first embodiment described above, the auxiliary wheels 12 are arranged in a single column, so that the traveling structure is liable to slip depending on conditions of the road surface because of small frictional resistance due to the small grounding area in the single column. Then, according to this embodiment, the auxiliary wheels are arranged in a double column so as to increase the grounding area and prevent slippage relative to the road surface from being generated on any road surface.

A wheel 2 comprises an auxiliary-wheel carrier 21, a lateral pair of auxiliary wheels 22 and 23 rotatably journaled on bearings of both sides of the auxiliary-wheel carrier 21, a pair of caps 24 and 25 for preventing the auxiliary wheels 22 and 23 from coming off the auxiliary-wheel carrier 21, and an axle shaft 26 inserted into and fixed to holes 21a, 24a, and 25a of the auxiliary-wheel carrier 21 and the caps 24 and 25.

The both sides of the auxiliary-wheel carrier 21 and the surfaces of the caps 24 and 25 opposing the auxiliary-wheel carrier 21 are provided with a plurality of grooves 21b, 24b, and 25b (in the drawing, the number of wheels of each of the auxiliary wheels 22 and 23 is eight, so that there are eight grooves), into which the auxiliary wheels 22 and 23 are inserted. Also, the auxiliary-wheel carrier 21 is provided with bearings 21c formed for journaling shafts 22a and 23a of the auxiliary wheels 22 and 23 thereon.

Although not shown, a gear and pulley are attached on the lateral face of any one of the caps 24 and 25 and connected to the driving source via a reducer gear. Also, the grooves and bearings to be inserted by the auxiliary wheels 22 and 23 are formed by displacing their positions so that the auxiliary wheels 22 and 23 are not opposed to each other.

Figure 5:
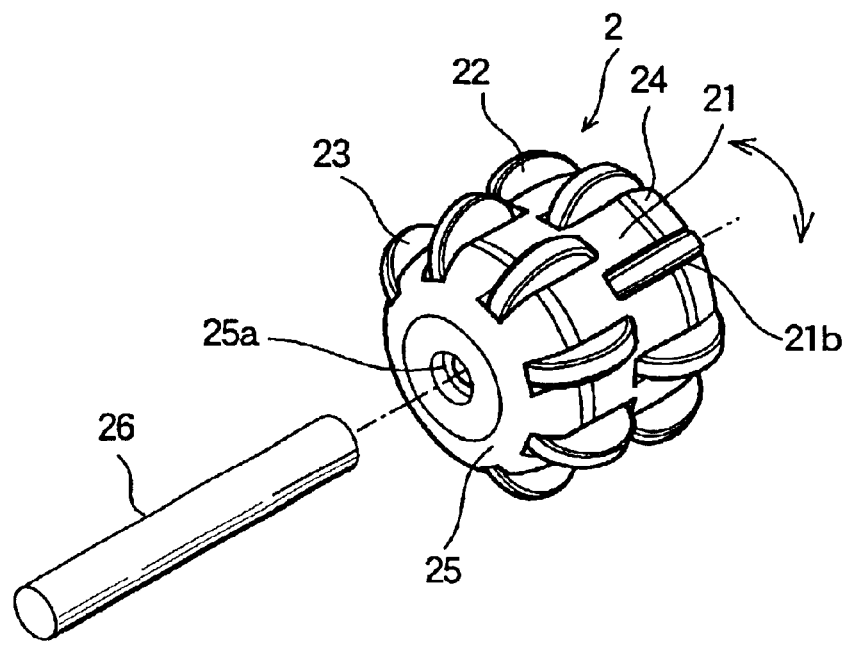
FIG. 5 is a perspective view of the second embodiment in an assembled state.
Figure 6:
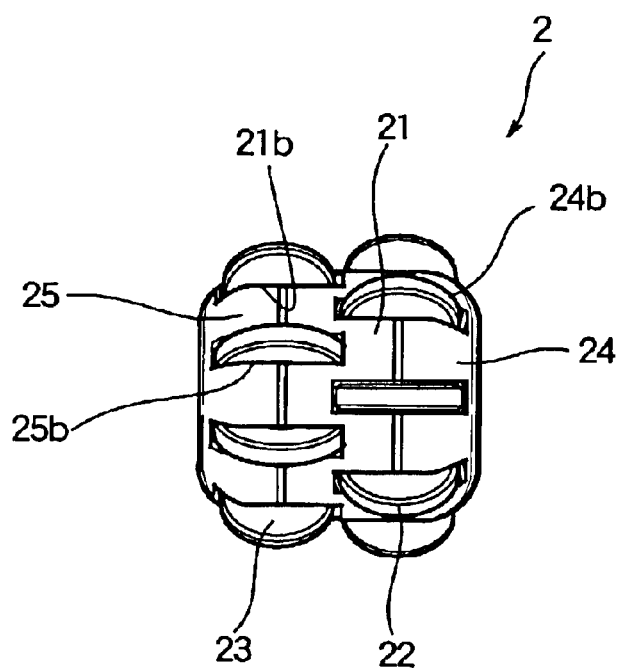
FIG. 6 is a front view of the second embodiment in the assembled state.

In the wheel 2 configured as described above, when a rotational force is applied in the arrow directions in FIG. 5, the wheel 2 is movable in the rotational direction by the frictional force between the auxiliary wheels 22 and 23 and the supporting surface. On the other hand, when a moving force is applied in the direction parallel to the axle shaft 26, the auxiliary wheels 22 and 23 become a state of idle running, so that the structure is smoothly movable in the direction perpendicular to the arrow directions.

According to the second embodiment, there are provided the two auxiliary wheels 22 and 23, so that the grounding area is increased, enabling the structure to securely travel even when the road is slippery. Furthermore, during the stopping of the wheel 2, when the traveling structure is pushed in the direction perpendicular to the rotational direction of the wheel 2, the auxiliary wheels 22 and 23 rotate, enabling the traveling structure to be moved just beside. Therefore, when the structure is applied to a traveling toy, the game fascinating aspect is improved, while when the structure is applied to a cultivator, upon completion of furrowing at the field end, the next furrowing can be continued by pushing the cultivator just beside.

In addition, according to the second embodiment described above, the auxiliary wheels 22 and 23 are staggered to each other (formed by displacing their positions); alternatively, the auxiliary wheels 22 and 23 may be arranged in a single horizontal row. In this case, the width of the wheel 2 is increased.

What is claimed is:

1. A wheel for a traveling structure comprising:

a pair of substantially hemispherical auxiliary-wheel carriers that rotate in a rotational direction when the traveling structure proceeds along a traveling surface in a generally straight direction; and a plurality of auxiliary wheels attached to the auxiliary-wheel carrier at circumferentially spaced apart locations so as to be freely rotatable in a direction perpendicular to the rotational direction of the auxiliary-wheel carrier, wherein said auxiliary wheel carriers have a plurality of grooves formed in a radial direction and bearings formed on both sides of the grooves; and wherein said auxiliary wheels are in the form of circular discs having opposed planar faces; and wherein each of said circular discs protrudes outwardly from an external peripheral surface of the auxiliary-wheel carrier so that portions of said planar faces are exposed to thereby allow said circular discs to bite into said traveling surface; and wherein said auxiliary wheels include shafts journaled on the bearings to allow said auxiliary wheels to be freely rotatable and to mount the auxiliary wheels to the auxiliary wheel carriers in such a manner that part of the auxiliary wheels is exposed from the grooves.

2. A wheel for a traveling structure as in claim 1, wherein said plurality of auxiliary wheels are arranged in at least a double-column arrangement relative to the auxiliary-wheel carrier in a direction perpendicular to the rotational direction of the auxiliary-wheel carrier, a part of the auxiliary wheels being exposed from the external peripheral surface of the auxiliary-wheel carrier.

3. A wheel for a traveling structure as in claim 1, comprising caps for covering both sides of the auxiliary-wheel carriers.

4. A wheel according to claim 2, wherein the auxiliary wheels arranged in the double-column are staggered relative to each other.

5. A traveling toy which comprises a wheel as in any one of claims 1, 2, 3 and 4.

6. A utility vehicle which comprises a wheel as in any one of claims 1, 2, 3 and 4.

* * * * *